UNITED STATES PATENT OFFICE.

EMIL F. DIETERICHS, OF CLEVELAND, OHIO.

COMPOUND OIL.

SPECIFICATION forming part of Letters Patent No. 260,670, dated July 4, 1882.

Application filed June 14, 1882. (No specimens.)

*To all whom it may concern:*

Be it known that I, EMIL F. DIETERICHS, of Cleveland, in the county of Cuyahoga, and in the State of Ohio, have invented certain new and useful Improvements in Compound Oil; and I do hereby declare that the following is a full, clear, and exact description thereof.

This invention relates to an improved compound oil for dubbing and preserving leather, for preserving and waterproofing fabrics, for filling the pores of wood, stone, paper, or cordage, for coating metals, and for lubricating and other general purposes; and it is an improvement upon the inventions for which Letters Patent of the United States were granted to me bearing date and numbered respectively as follows, viz: April 28, 1874, No. 150,303; January 4, 1876, No. 171,719, and December 14, 1875, No. 170,940.

In carrying out my invention I first prepare what I denominate as "alumina oil" by combining neat's-foot oil, lard-oil, olive-oil, or any fat or fatty matter containing oleic, margaric, stearic, or other fatty acids with alum, sulphate of alumina, or any of the alumina salts, as more fully hereinafter specified.

In effecting the combination of the oils, fat, fatty matter, or acids with the alumina salts, the said oils, fat, fatty matter, or acids, either alone or combined, are united with any suitable alkali in solution until complete or nearly complete neutralization is effected. The compound is then diluted with hot water, and a solution of alum, sulphate of alumina, or any of the alumina salts is added, causing the precipitation of an alumina compound. The resulting pasty mass is then thrown on a filter and washed. Fish-oil, neat's-foot oil, or any oxyhydrocarbon or hydrocarbon oil that will combine uniformly without being affected by the heat necessary to effect the combination is then heated until all the watery or glutinous impurities have been expelled or precipitated. The alumina compound is then diluted with or dissolved in such oils in proportion suitable to the use intended, the ingredients being agitated until a homogeneous compound ready for use is obtained.

The proportion of the alumina compound and the prepared oil employed may be varied indefinitely without departing from the spirit of my invention; but the following proportions I have found to answer well for general purposes, viz: one gallon of oil to sixteen ounces of the alumina compound. These substances are mixed and stirred, with the aid of heat, if necessary, until the alumina compound is thoroughly dissolved and a homogeneous compound ready for use is obtained.

Although I have specially mentioned and design particularly to employ the salts of alumina in the preparation of my improved compound oil, other salts which are adapted to unite with the fatty acids may be employed, among which may be mentioned the salts of lead, magnesia, and other bases.

Having thus fully described my invention, what I claim, and desire to secure by Letters Patent, is—

As a new manufacture, for the purposes described, a compound oil consisting of alumina compound dissolved in oil or fatty matter or in any oxyhydrocarbon or fluid hydrocarbon, substantially as specified.

In testimony whereof I affix my signature, in presence of two witnesses, this 13th day of June, 1882.

EMIL F. DIETERICHS.

Witnesses:
J. J. MCCARTHY,
EDWIN L. JEWELL.